United States Patent [19]

Broer et al.

[11] Patent Number: 5,042,925
[45] Date of Patent: Aug. 27, 1991

[54] POLARIZATION-SENSITIVE BEAM SPLITTER HAVING A POLARIZING BIREFRINGENT ORIENTED POLYMER ADHESIVE LAYER

[75] Inventors: Dirk J. Broer; Adrianus J. S. M. de Vaan; Jörg Brambring, all of Eindhoven, Netherlands

[73] Assignee: U.S. Philips Corporation, New York, N.Y.

[21] Appl. No.: 521,773

[22] Filed: May 10, 1990

[30] Foreign Application Priority Data

Nov. 14, 1989 [NL] Netherlands .................. 8902805

[51] Int. Cl.$^5$ .................. G02F 1/13; G02B 5/30
[52] U.S. Cl. .................. 359/37; 359/40; 359/63
[58] Field of Search .............. 252/585; 350/352, 401, 350/400 US, 394 US, 395 US, 337, 350 R, 334 US

[56] References Cited

U.S. PATENT DOCUMENTS

| | | | |
|---|---|---|---|
| 3,704,937 | 12/1972 | Holmes et al. | 350/164 X |
| 4,560,594 | 12/1985 | Cobbs, Jr. | 428/1 |
| 4,702,557 | 10/1987 | Beckmann et al. | 350/330 |
| 4,781,426 | 11/1988 | Baker | 30/331 R X |
| 4,938,568 | 7/1990 | Margerum | 350/334 |
| 4,944,576 | 7/1990 | Lacker et al. | 350/334 |

FOREIGN PATENT DOCUMENTS

| | | | |
|---|---|---|---|
| 52-07749 | 11/1977 | Japan | 350/341 |
| 59-111113 | 6/1984 | Japan | 350/337 |
| 62-70407 | 3/1987 | Japan . | |
| 62-150220 | 7/1987 | Japan . | |
| 1-145627 | 6/1989 | Japan . | |

Primary Examiner—Stanley D. Miller
Assistant Examiner—Ron Trice
Attorney, Agent, or Firm—Norman N. Spain

[57] ABSTRACT

In a polarization-sensitive beam splitter 10 having a polarization-separating layer 13 interposed between two transparent elements 11, 12, the two transparent elements consist of non-birefringent material and the polarization-separating layer is a polarizing birefringent oriented polymer adhesive layer. The polarization-separating layer is manufactured from a curable synthetic resin composition comprising liquid-crystalline monomers or oligomers, the molecules in the curable synthetic resin composition being oriented uniaxially after which the synthetic resin composition is cured.

5 Claims, 1 Drawing Sheet

POLARIZATION-SENSITIVE BEAM SPLITTER HAVING A POLARIZING BIREFRINGENT ORIENTED POLYMER ADHESIVE LAYER

BACKGROUND OF THE INVENTION

The invention relates to a polarization-sensitive beam splitter having a polarization-separating layer interposed between two transparent elements, said polarization-separating layer comprising a birefringent material.

The invention also relates to a method of manufacturing a polarization-sensitive beam splitter, in which a polarization-separating layer is interposed between two transparent elements.

According to the state of the art a polarization-sensitive beam splitter can be manufactured in the form of a Wollaston prism as described in McGraw-Hill Encyclopedia of Science and Technology, vol 10, page 499 (1960). To avoid the use of birefringent prisms, a polarization-separating layer which is interposed between two transparent elements can be used in known manner. There elements may be composed of ordinary glass or a synthetic resin having the same single refractive index, see United States Patent Specification U.S. Pat. No. 4,702,557. In this specification, the polarization-separating birefringent layer consists of a liquid-crystalline layer having a thickness of 5 to 10 $\mu$m. One of the refractive indices of said layer must be equal to the refractive index of the elements and the other refractive index must be smaller than the refractive index of the elements.

According to the state of the art, a thin liquid-crystalline layer is applied between two substrates (the transparent elements) by means of capillary forces. Means for sealing the thin layer from the environment must be provided. Further, it is necessary to position and secure the two substrates at a fixed distance from each other. A further disadvantage of the known devices is the difficulty of providing suitable liquid-crystalline materials having the above-described refractive indices. Moreover, the temperature resistance of liquid-crystalline layers is generally small.

SUMMARY OF THE INVENTION

One of the objects of the invention is to provide a polarization-sensitive beam splitter of a simpler construction. In this connection an object of the invention is to provide menas to atune the refractive indices of the polarization-separating layer and the transparent elements to each other in a simple manner. Another object of the invention is to provide a beam splitter which is little temperature dependent and which is also temperature resistant. Yet another object of the invention is to provide a simple and efficacious method of manufacturing a polarisation-sensitive beam splitter.

According to the invention, this object is achieved by a polarization-sensitive beam splitter as described in the opening paragraph, which is characterized in that the polarisation-separating layer is a birefringent adhesive layer.

DETAILED DESCRIPTION OF THE INVENTION

Figure 1:
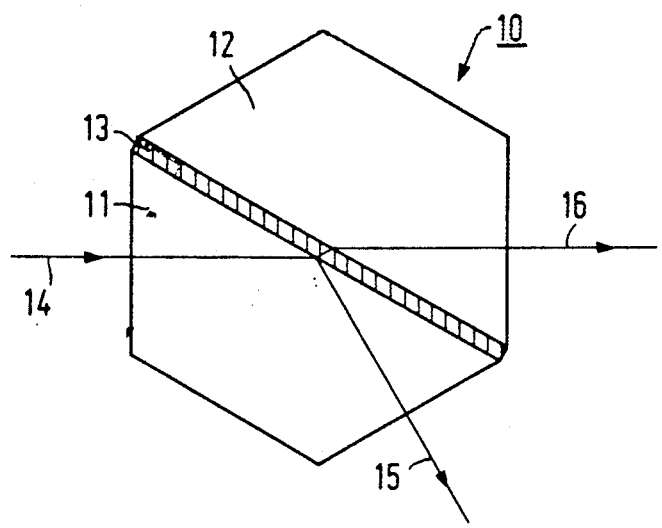
FIG. 1 is a cross-sectional view of a polarization-sensitive beam splitter of the invention

In a preferred embodiment of the polarisation-sensitive beam splitter according to the invention the polarization-separating layer is a unaxially oriented polymer layer.

According to another aspect of the invention, a very temperature-resistant beam splitter is obtained when the polymer layer is formed from a cured liquid-crystalline monomer composition. Preferably, the polymer layer is formed from a polymer network having nematic groups in the molecular chains.

In order to orient the polymer layer by rubbing the surface of the transparent elements, it is efficacious for a layer of polyimide to be present between the polymer layer and each of the transparent elements.

According to a preferred aspect of the invention, the object of providing a method of manufacturing a polarization-sensitive beam splitter is achieved by a method as described in the opening paragraph, which method is characterized in that the polarization-separating layer is manufactured from a curable synthetic resin composition which comprises liquid-crystalline monomers or oligomers, the molecules in the curable synthetic resin composition being uniaxially oriented after which the synthetic resin composition is cured.

A particularly temperature-resistant polarization-sensitive beam splitter is obtained when the liquid-crystalline monomers or oligomers consist of compounds having two or more acrylate-ester groups.

An additional advantage of the polarization-sensitive beam splitter according to the invention is that it can be used for a wide range of wavelengths. When the thickness of the polarization-separating layer is sufficiently large the operation is substantially independent of the layer thickness selected. The layer thickness must be sufficiently large to bring about a complete reflection of the ordinary light ray, for example larger than 1 $\mu$m. The permissible layer thickness is limited, however, by material cost and absorption of the extraordinary light ray.

In a suitable embodiment of the method according to the invention, the orientation is obtained by rubbing each of the surfaces contacting the curable synthetic resin composition in one direction. In a preferred embodiment of such a method the surfaces to be rubbed are coated with a layer oi polyimide.

In an alternative embodiment of the method according to the invention, the orientation is obtained by means of an electric or magnetic field whose field lines extend perpendicularly to the optical axis of the beam splitter.

A particular advantage of the method according to the invention is the possibility of influencing the refractive indices of the polarization-separating layer by the choice of the temperature at which the curable synthetic resin composition is cured. A free choice of said curing temperature is possible when the synthetic resin composition is made to cure by means of actinic radiation. Moreover, in this process the orientation provided is rapidly fixed. It is additionally possible to cure the synthetic resin composition in a thermal manner, for example by using a thermal initiator such as benzoyl peroxide.

In the non-prepublished Netherlands Patent Application NL 8802683 a description is given of the use of an adhesive which is composed of liquid-crystalline monomers which are optionally oriented before the curing operation in order to obtain an adhesive bond having a high positional accuracy. The adhesive compositions described therein are suitable for use in the beam splitter and the method according to the invention.

In U.S. Pat. No. 4,293,435 a description is given of liquid-crystalline polymers. These polymers do not form a network and the nematic groups are present only in side chains of the polymer molecules. The temperature resistance of these compounds is higher than that of low-molecular liquid-crystalline compounds, but once the temperature has exceeded the glass transition temperature the orientation in the material is permanently lost.

For clarity, it is to be noted that a polarisation-sensitive beam splitter can also be used in known manner as a beam adder, see also U.S. Pat. No. 4,702,557.

EXEMPLARY EMBODIMENT

FIG. 1 is a cross-sectional view of a polarization-sensitive beam splitter 10 which is composed of two glass prisms 11 and 12. A birefringent adhesive layer 13 is interposed between said prisms, the extraordinary refractive index of said adhesive layer being equal to the refractive index of the material of the prisms. The ordinary refractive index of the birefringent adhesive layer is smaller than the extraordinary refractive index and, hence, it is also smaller than that of the prisms. According to the example, the molecules in the birefringent adhesive layer are uniaxially oriented in the direction perpendicular to the plane of the drawing.

An incident light ray 14 is split into an extraordinary light ray 16 which, according to the exemplary embodiment, extends in a straight line, and an ordinary light ray 15 which is totally reflected at the interface with the polarization-separating layer. The light rays 15 and 16 are polarized in mutually perpendicular directions. Unlike polarizers which are based on absorption of one of the principal light rays, in this case, no light is lost. A further important aspect is that in the polarization-sensitive beam splitter according to the invention no heating-up takes place as a result of such absorption.

Figure 2:
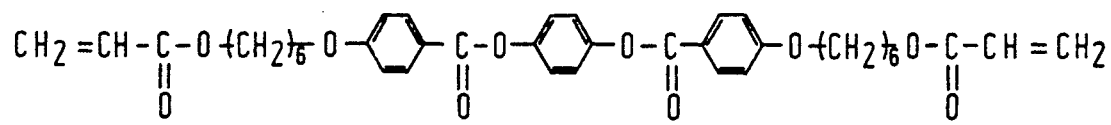
FIG. 2 is a structural formula of a liquid-crystalline material suitable for the invention.

Suitable birefringent adhesive compositions are liquid-crystalline acrylates, epoxides and vinyl ethers as described in, for example, Netherlands Patent Application NL 8802683. Particularly suitable are network-forming monomer compositions such as diacrylates, the structural formula of an example of which is shown in FIG. 2. By means of a product is manufactured having a small temperature dependence this.

According to the example, the thickness of layer 13 ranges between 5 and 10 $\mu$m. An orientation layer of polyimide having a thickness of 50 nm is applied to the part of the surfaces of the prisms 11 and 12 contacting the adhesive layer 13. The surfaces are rubbed with a cloth after which the liquid-crystalline monomers orient themselves in the direction of rubbing. The orientation can alternatively be attained by placing the assembly of prisms in a magnetic field having a strength of, for example, 15 kGuass, which extends perpendicularly to the optical axis of the beam splitter.

The liquid-crystalline monomers are cured in the oriented state by exposure to actinic radiation, in this example by UV light. For this purpose, 1 to 2% by weight of a light-sensitive initiator such as 2,2-dimethoxy-2-phenyl-acetophenone is added to the monomer composition.

Figure 3:
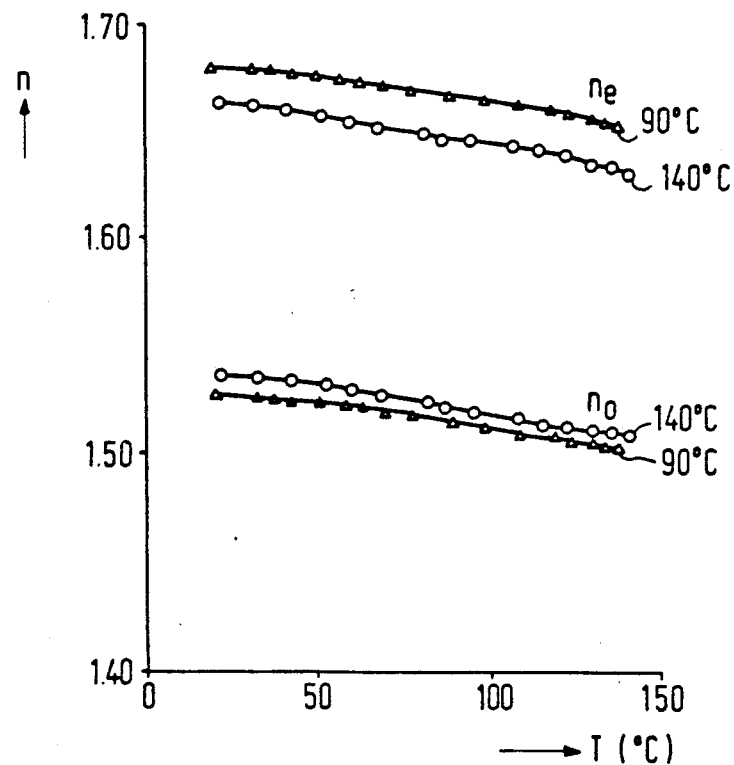
FIG. 3 is a graph showing refractive indices of a cured liquid-crystalline material suitable for the invention.

FIG. 3 shows the refractive index n of the cured adhesive layer as a function of the temperature T. $n_o$ is the ordinary refractive index, $n_e$ is the extraordinary refractive index. The refractive indices are plotted for a curing temperature of 90° C. and a curing temperature of 140° C. The diagram shows that in particular the extraordinary refractive index, which has to be adapted to the refractive index of the material of the prisms, can be influenced by the choice of the temperature at which the monomer composition is cured to by exposure to UV light.

We claim:

1. A polarization-sensitive beam splitter comprising two transparent elements joined together, at mutually opposing surfaces, by a polarizing birefringent oriented polymer adhesive layer.

2. A polarization-sensitive beam splitter as claimed in claim 1, wherein the polarizing birefringent adhesive layer is a uniaxially oriented polymer layer.

3. A polarization-sensitive beam splitter as claimed in claim 2, wherein the polymer layer is formed from a cured liquid-crystalline monomer composition.

4. A polarization-sensitive beam splitter as claimed in claim 3, wherein the polymer layer is formed from a polymeric network having nematic groups in the molecular chains.

5. A polarization-sensitive beam splitter as claimed in claim 3, wherein a polyimide layer is present between the polymer layer and each of the transparent elements.

* * * * *